United States Patent [19]

Hull

[11] Patent Number: 4,859,517
[45] Date of Patent: Aug. 22, 1989

[54] FORMABLE HONEYCOMB PANEL

[75] Inventor: H. Robert Hull, San Leandro, Calif.

[73] Assignee: Hexcel Corporation, Dublin, Calif.

[21] Appl. No.: 25,980

[22] Filed: Mar. 16, 1987

[51] Int. Cl.$^4$ .............................................. B32B 3/12
[52] U.S. Cl. ................................... 428/116; 156/292; 428/131; 428/134; 428/593
[58] Field of Search .............. 428/134, 116, 117, 118, 428/73, 131, 593; 52/806; 156/197, 292

[56] References Cited

U.S. PATENT DOCUMENTS

| | | | |
|---|---|---|---|
| 2,926,761 | 3/1960 | Herbert, Jr. | 428/116 X |
| 2,941,759 | 6/1960 | Rice et al. | 428/118 X |
| 2,956,651 | 10/1960 | Alred et al. | 428/593 |
| 2,962,403 | 11/1960 | Jones | 428/118 |
| 3,021,565 | 2/1962 | Bowman | 428/117 X |
| 3,060,561 | 10/1962 | Watter | 428/116 X |
| 3,067,507 | 12/1962 | Titus | 428/116 X |
| 3,133,133 | 5/1964 | Fairbanks | 428/118 X |
| 3,196,533 | 7/1965 | Ida et al. | 428/116 X |
| 3,342,666 | 9/1967 | Hull | 428/116 X |
| 3,391,511 | 7/1968 | Harris et al. | 428/118 |
| 3,501,367 | 3/1970 | Parker | 428/116 |
| 3,630,312 | 12/1971 | Woodward et al. | 428/116 X |
| 3,687,223 | 8/1972 | Streck | 428/116 X |
| 3,817,810 | 6/1974 | Ronan et al. | 428/116 X |
| 3,821,999 | 7/1974 | Guess et al. | 428/116 X |
| 3,919,445 | 11/1975 | Smarook | 428/116 |
| 3,969,563 | 7/1976 | Hollis, Sr. | 428/117 X |
| 4,344,266 | 8/1982 | Gray | 428/118 X |
| 4,433,021 | 2/1984 | Riel | 428/116 |
| 4,453,367 | 6/1984 | Geyer et al. | 428/116 X |
| 4,548,665 | 10/1985 | Morin | 156/197 |
| 4,600,619 | 7/1986 | Chee et al. | 156/292 X |

Primary Examiner—Henry F. Epstein
Attorney, Agent, or Firm—Limbach, Limbach & Sutton

[57] ABSTRACT

A formable honeycomb panel is disclosed that comprises a core layer and two skin panels of sheet material bonded to opposite sides of the core layer. At least one of the skin panels is porous and has an effective stiffness that is substantially less than the stiffness of a solid sheet of material of the same thickness. The stiffness of the porous skin panel is sufficiently low so that bending of the honeycomb panel is accommodated primarily by deformation of the porous skin panel before the core layer collapses or the adhesive bonds between the core layer and the skin panels fail.

19 Claims, 2 Drawing Sheets

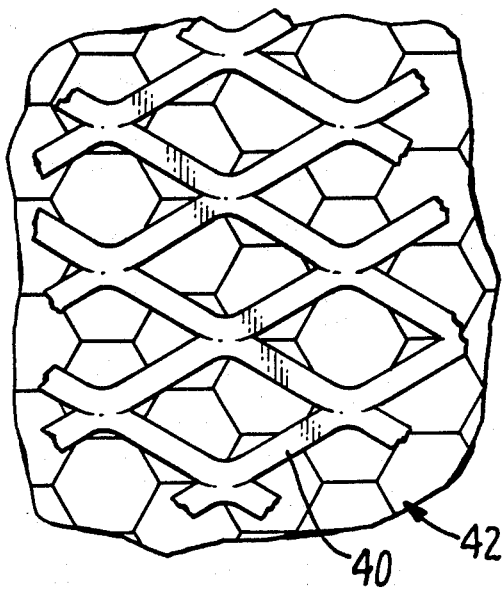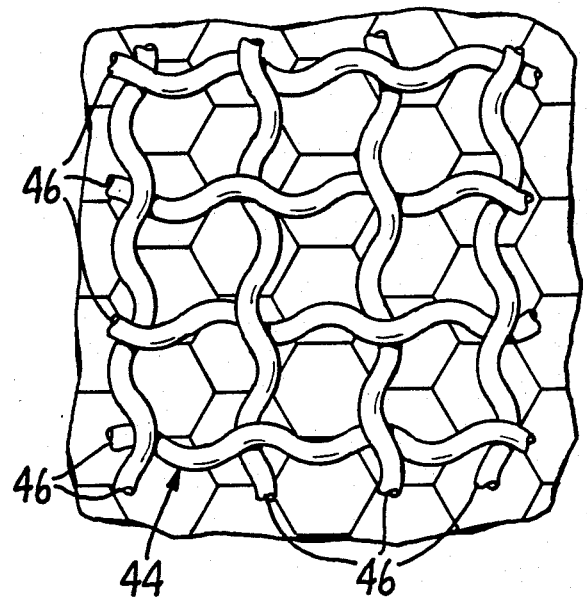
FIG. 5.  FIG. 6.
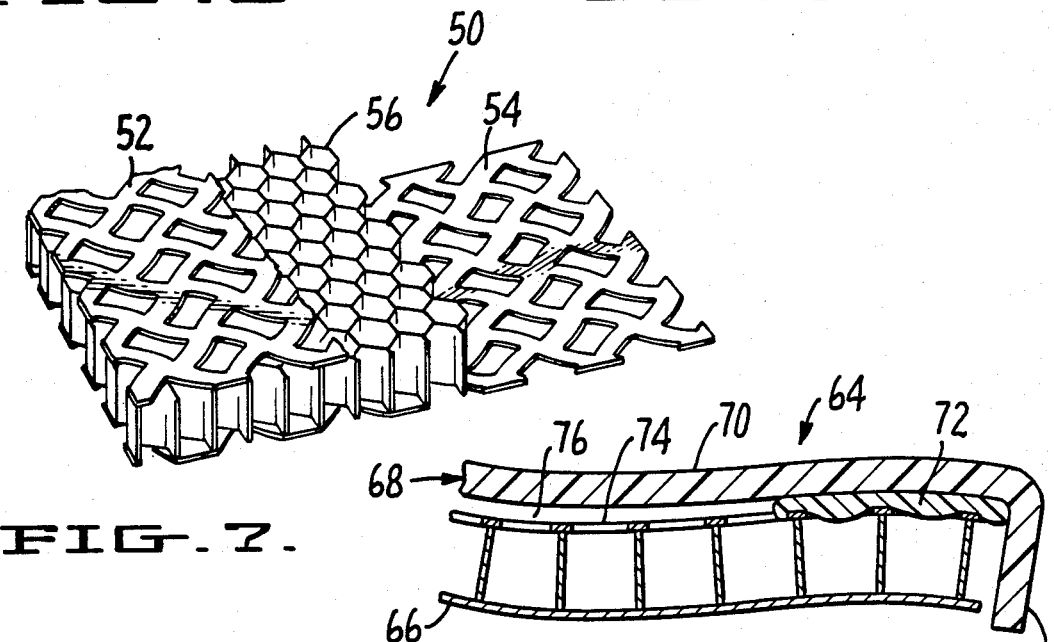
FIG. 7.  FIG. 9.
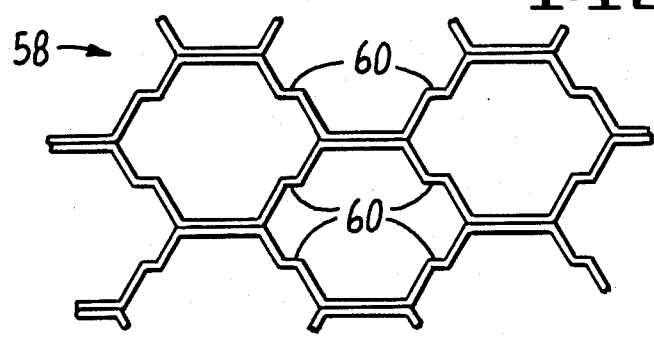
FIG. 8.

FORMABLE HONEYCOMB PANEL

BACKGROUND OF THE INVENTION

1. Field of the Invention

This invention relates generally to honeycomb panels, and relates more particularly to a honeycomb panel that is readily formable by virtue of a porous, rather than solid, skin panel.

2. Description of the Relevant Art

A honeycomb panel consists of a core material sandwiched between and bonded to two skin panels. The core material is light in weight and, typically, is composed of a cellular material having cells that extend transversely between the two skin panels. The skin panels are typically thin, solid sheets of material, commonly metal, that are adhesively bonded to both sides of the core layer.

Honeycomb panels are light in weight but very stiff in response to bending loads. The core layer separates the two solid skin panels by a distance equal to the thickness of the core layer, thereby providing a relatively large moment of inertia about a principal axis parallel to the plane of the skin panels. The skin panels take the bulk of the tensile and compressive loads generated in bending.

Since a honeycomb panel is a multi-piece assembly of the core layer and the two skin panels, the fabrication cost of honeycomb panels can be significant. For that reason, the utilization of honeycomb panels has been limited to those applications for which the advantages of lightness and stiffness outweigh the disadvantage of high fabrication cost.

Honeycomb panels are used extensively in the aircraft and aerospace industries, but such panels often must be curved or otherwise configured in shapes other than flat. Honeycomb panels are typically fabricated by forming the core layer to a desired contour, then coating the core layer or skin panels with adhesive, positioning the two skin panels on either side of the core layer, and then placing this assembly in a curing press, which laterally compresses the panel until the adhesive is cured. In fabricating curved honeycomb panels, the curing press utilizes a specially shaped die that holds the pre-bond assembly at the desired shape while the adhesive cures. The skin panels may be preformed to their desired contours prior to loading into the curing press.

If the honeycomb panel is flat rather than curved, significant reductions in fabrication cost can be realized by using a flat press and curing several panels simultaneously. The lower cost of tooling and increased production throughput of this technique significantly decreases the production cost of flat honeycomb panels as compared to curved panels. The disadvantage to flat curing is that conventional flat honeycomb panels can not be readily formed into curved panels due to the inherent stiffness of the panels. Attempts to form curved honeycomb panels from flat panels typically result in destroying the adhesive bonds or collapsing the core layer, thereby ruining the honeycomb panel.

Conventional honeycomb panels have not been used extensively in the automobile industry due to cost and finish considerations. In ground-based transportation vehicles, the weight savings of conventional honeycomb panels in comparison to conventional solid metal panels is not significant enough to offset the higher cost of fabrication. Honeycomb panels in such applications often need to be curved, thereby precluding the use of the above-described, low-cost method for fabricating flat honeycomb panels. In addition, the outer surface of a conventional honeycomb panel does not provide a smooth enough surface for use as an exposed panel, given the high quality of surface finish that the automotive industry demands.

In certain instances, the automobile industry has switched from stamped sheet metal body panels to molded plastic body panels. Such plastic body panels typically are constructed in two pieces, an outer cosmetic panel and an inner reinforcing panel, both molded from sheet molding compound (SMC), which is usually composed of a resin reinforced with fibrous glass material. The cosmetic panel usually has a uniform thickness because abrupt changes in panel thickness would be visible in the outer surface. Since the cosmetic panel is not stiff enough to use by itself, the reinforcing panel is bonded to its back side, thus providing a moderately stiff assembly of perhaps ⅜ to ¾ of an inch in total thickness. The reinforcing panel typically includes ribs or other structural features designed to increase the stiffness of the assembly without unduly increasing its weight.

SUMMARY OF THE INVENTION

To overcome the impediments to using curved honeycomb panels in cost-sensitive applications, one aspect of the present invention provides an initially flat honeycomb panel that is readily formable by virtue of the relatively low stiffness of one or both of the skin panels. Some of the stiffness of a convention honeycomb panel is sacrificed in favor of significantly increased formability. Another aspect of the present invention provides a structural panel assembly of a formable honeycomb panel plus a separate cosmetic panel. The cosmetic panel, which is preferably fabricated from sheet molding compound, provides a high quality, cosmetic surface suitable for exterior applications, while the formable honeycomb panel provides reinforcement for the assembly.

In accordance with the illustrated embodiments, the present invention provides a formable honeycomb panel that comprises a core layer and two skin panels of sheet material bonded to opposite sides of the core layer. At least one of the skin panels is composed of a sheet of material having a plurality of openings extending through the thickness thereof, as a result of which this "porous" skin panel has an effective stiffness that is substantially less than the stiffness of a solid sheet of material of the same thickness. The stiffness of the porous skin panel is sufficiently low so that bending of the honeycomb panel is accommodated primarily by deformation of the porous skin panel before the core layer collapses or the adhesive bonds between the core layer and the skin panels fail.

In the preferred embodiment of the formable honeycomb panel, the porous skin panel is a perforated metal sheet, where the perforations define cells having curved walls or members. The perforations in the metal sheet lower the stiffness of the porous skin panel in comparison to that of a solid sheet for two reasons. First, the cross-sectional area of the perforated metal sheet is less than that of a solid sheet of the same thickness. Second, the curved cell walls further lower the stiffness of the perforated metal sheet because the curved walls themselves will bend in the plane of the panel in response to a bending load.

The present invention also provides a structural panel assembly comprising a cosmetic panel having first and second sides with the first side providing a decorative face and the second side coupled to a reinforcement panel. The reinforcement panel is a formable honeycomb panel that includes a core layer and two skin panels bonded to opposite sides of the core layer, where at least one of the skin panels is porous. Any bending of the reinforcement panel prior to attachment to the cosmetic panel is accommodated primarily by deformation of the porous skin panel. Preferably, the cosmetic panel is a molded panel, suitable for high-quality finishing, composed of a material such as sheet molding compound.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4A shows an undeformed cell; FIG. 4B shows a cell deformed by a tensile load; FIG. 4C shows a cell deformed by a compressive load.

FIG. 5 is a top detail view of an alternative embodiment of the formable honeycomb panel, illustrating an expanded metal skin panel.

FIG. 6 is a top detail view of another embodiment of the formable honeycomb panel, illustrating a woven metal skin panel.

FIG. 7 is a perspective view, partially cut away, of a formable honeycomb panel having two porous skin panels.

FIG. 8 is a top detail view of an alternative core layer that provides increased formability of the core layer of the formable honeycomb panel.

FIG. 9 is a sectional view of a composite structural panel assembly, according to the present invention.

DETAILED DESCRIPTION OF THE PREFERRED EMBODIMENT

FIGS. 1 through 9 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
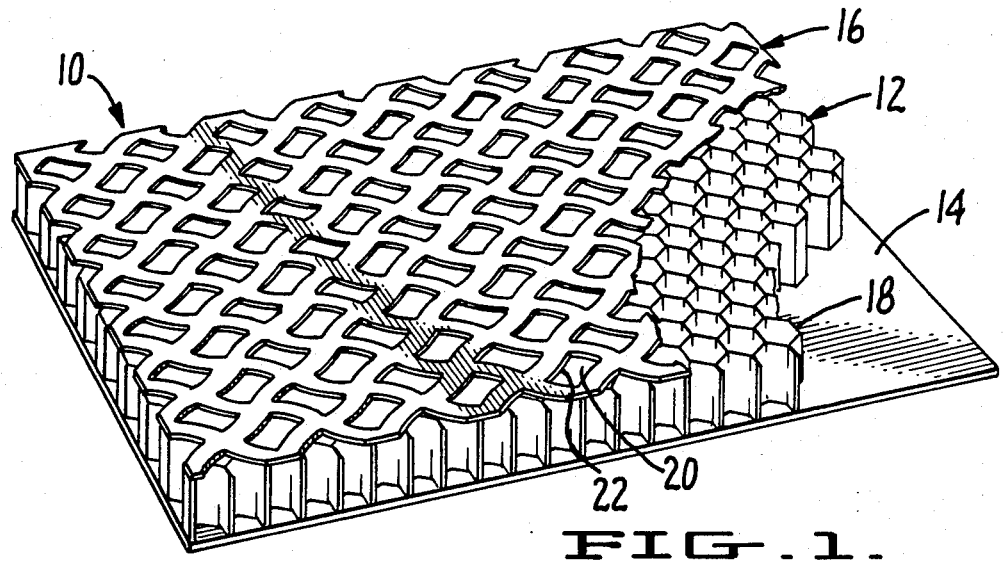
FIG. 1 is a perspective view, partially cut away, of a formable honeycomb panel, according to the present invention, in a flat configuration.

The preferred embodiment of the present invention is a honeycomb panel that is readily formable by virtue of a porous, rather than solid, skin panel. As shown in FIG. 1, the honeycomb panel 10 of the present invention includes a core layer 12 bounded on one side by a solid skin panel 14 and on the other by a porous skin panel 16. The core layer 12 is preferably a cellular honeycomb, having cells 18 that are roughly hexagonal in shape and that extend transversely across the thickness of the core layer. Bonded to one side of the core layer 12 is the solid skin panel 14 and bonded to the other side is the porous skin panel 16. The skin panels are bonded to the core layer using the same types of adhesives used for bonding conventional honeycomb panels.

The formable honeycomb panel 10 is fabricated according to standard methods of fabricating conventional honeycomb panels. Adhesive is applied to both sides of the core layer 12 and/or to the inner sides of the skin panels 14 and 16 and the skin panels are placed on opposite sides of the core layer. This pre-bond assembly is then placed in a flat press for curing. Several formable honeycomb panels 10, all flat, can be curing simultaneously in the same flat press by stacking several pre-bond assemblies in the press.

The adhesive used to bond the skin panels 14 and 16 to the core layer 12 need not be a liquid adhesive. Adhesive films, either supported or non-supported, may be used as the bonding agent.

In the embodiment shown in FIGS. 1 through 4, the porous skin panel 16 is a perforated sheet of metal. The perforations 20 define cells having walls or members 22 that are curved. As best seen in FIG. 4A, each perforation is a symmetrical four-sided figure having two opposite convex sides 26 and two opposite concave sides 24. Adjacent perforations 20 are oriented orthogonally so that each member 22 is bounded by a convex side 26 of one perforation and a concave side 24 of an adjacent perforation.

Figure 2:
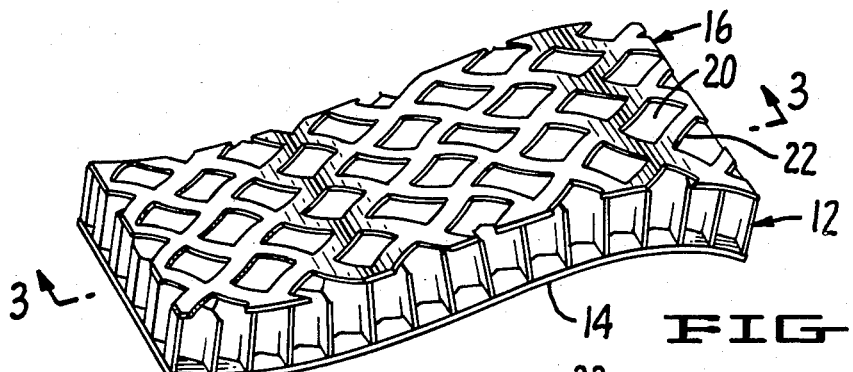
FIG. 2 is a perspective view of the formable honeycomb panel of FIG. 1 in a curved or formed configuration.
Figure 3:
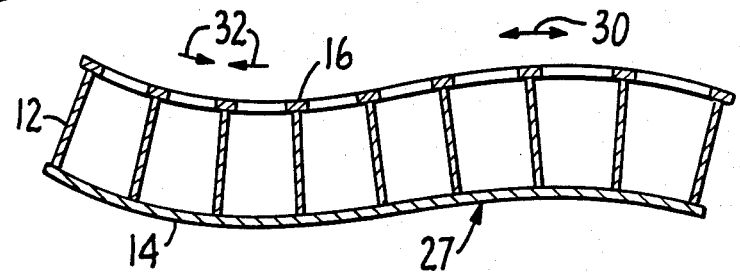
FIG. 3 is a sectional detail view, taken along section lines 3—3 of FIG. 2, of the formable honeycomb panel in a formed configuration.

The perforations 20 in the porous skin panel 16 reduce the effective stiffness of the porous skin panel to allow the honeycomb panel 10 to be bent without collapsing the core layer 12 or shearing the adhesive bonds between the core layer and the skin panels. As shown in FIGS. 2 and 3, the flat honeycomb panel 10 can be formed into a curved structure 27 by bending the panel. Any of a variety of standard forming techniques, such as press forming or hydro-forming, can be used to bend the panel 10 from a flat configuration to a curved one. The curvature need not be preferentially oriented, and can be a compound curvature. As seen best in FIG. 3, the porous skin panel 16 stretches and contracts as required to accommodate the desired degree of bending, while the solid skin panel 14 bends but does not expand or contract to any significant degree. The porous skin panel 16 expands to form convex areas of the formed honeycomb panel, as indicated by arrows 30, and contracts to form concave areas of the formed honeycomb panel, as indicated by arrows 32.

The stiffness of the porous skin panel 16 is less than that of a solid panel of the same thickness for two reasons. First, the total cross sectional area of the porous skin panel is less than that of a solid panel due to the perforations. Second, the members 22 are curved rather than straight, so that planar strain of the porous skin panel 16 is accommodated primarily by bending of the members in the plane of the skin panel rather than uniaxial elongation or compression thereof.

Figure 4A:
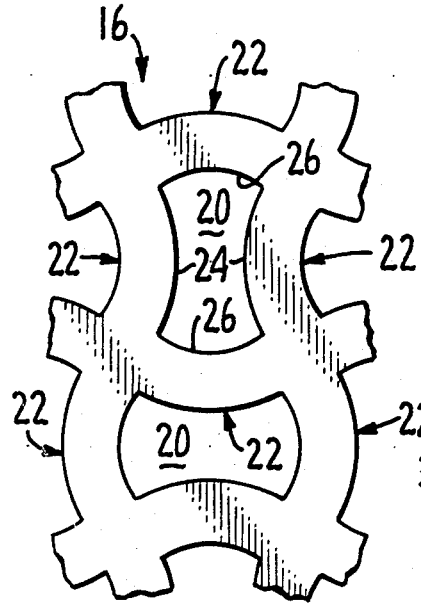
FIGS. 4A, 4B, and 4C are top detail views of cells of a porous skin panel of the formable honeycomb panel.
Figure 4B:
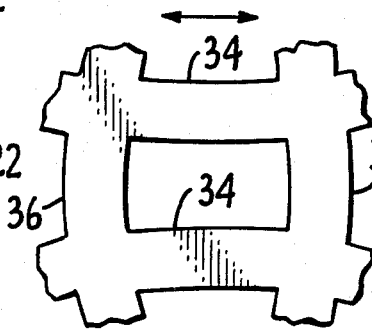
Figure 4C:
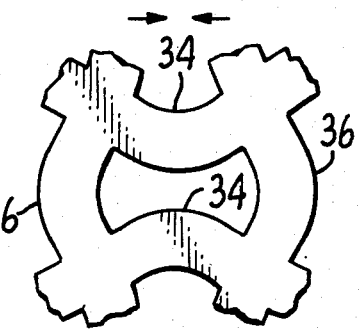

This second effect is illustrated in FIGS. 4A, 4B, and 4C, which show a cell of the porous skin panel in an unstressed state, in tension, and in compression, respectively. When a tensile stress is applied to the porous skin panel 16, as shown in FIG. 4B, the members 34 in the direction of the tensile stress bend to a straighter shape, causing the adjoining members 36 to also straighten. Member 34 straightens before it elongates, thus permitting the porous skin panel 16 to expand at a fairly low level of stress. The stress is sufficiently low so that the porous skin panel 16 will deform before the cell layer collapses or the adhesive bonds are sheared.

When a compressive stress is applied to the porous skin panel 16, as shown in FIG. 4C, the members 34 in the direction of the compressive stress bend to a more curved shape, causing the adjoining members 36 to also bend to a more curved shape. Member 34 deforms at a level of stress that is sufficiently low so that the porous skin panel 16 will deform before the cell layer collapses or the adhesive bonds are sheared. The actual limits for bend radii depend on the actual design of the formable honeycomb panel, including the size and shape of the perforations, the thickness and material of the skin panels, and the cell size, layer thickness, material thickness, and material of the core layer.

FIGS. 5 and 6 illustrate alternative types of porous skin panels. A sheet 40 of expanded metal is shown in FIG. 5 as the porous skin panel. As is well known in the art, the expanded metal panel 40 can be made by first piercing a solid sheet of metal with a series of slits and then expanding the sheet in a direction perpendicular to the slits. The slits expand into the diamond shaped openings 42. The expanded metal panel 40 is bonded to the core layer 12 with adhesives in the same manner as the perforated sheet 16. In this case, the deformation of the metal panel 40 is accommodated primarily by expansion and/or contraction of the straight members, rather than by the bending of the curved members of the embodiment shown in FIGS. 1-4.

A sheet 44 of woven metal fibers is shown in FIG. 6 as the porous skin panel. The individual metal fibers 46 are preferably crimped or kinked so that they are easily deformed, either expanded or compressed, like the curved members 22 of the perforated metal skin panel 16.

Additional embodiments of a formable honeycomb panel are shown in FIGS. 7 and 8, both providing increased formability of the honeycomb panel. Two porous skin panels 52 and 54 are used, instead of just one, in the formable honeycomb panel 50 shown in FIG. 7. The two porous skin panels 52 and 54 are bonded to the core layer 56 as described above. While the porous skin panels 52 and 54 are shown as perforated metal panels, they may also be expanded metal or woven, crimped metal fibers, as shown in FIGS. 5 and 6. When the formable honeycomb panel 50 is bent, both the skin panels expand and/or contract to accommodate the bending.

FIG. 8 shows an alternative cellular honeycomb 58 for use as the core layer of the formable honeycomb panel. This core structure has crimped side walls 60 so that the core layer itself can accommodate more strain prior to collapse than a standard hexagonal core structure. See U.S. Pat. No. 3,342,666, issued on Sept. 19, 1967 to the present inventor, which is hereby incorporated by reference, for a discussion of the structure and fabrication method of the cellular honeycomb 58.

Another aspect of the present invention is illustrated in FIG. 9, namely a structural panel assembly 64 that includes both a reinforcement panel 66 and a cosmetic panel 68. The cosmetic panel 68 provides a surface 70 suitable for high-quality finishing, while the reinforcement panel 66 provides reinforcement so that the assembly is fairly stiff. The reinforcement panel 66 is constructed like the above-described formable honeycomb panel 10, and may be bent to a desired contour. The cosmetic panel 68 is preferably molded from sheet molding compound to the desired contour. The two panels 66 and 68 are assembled by bonding the inner side of the cosmetic panel to one side of the reinforcement panel. Preferably, the adhesive 72 is a urethane adhesive, and the porous skin panel 74 of the reinforcement panel 66 is oriented toward the cosmetic panel 68. Also preferably, a bead of the adhesive is applied around the periphery of the bonding area plus droplets of adhesive within the bonding area. A small space 76 between the two panels 66 and 68 provides clearance for manufacturing tolerances of the contours of the panels. A variety of edge treatments are possible, such as a lip 78 on the cosmetic panel, as illustrated.

From the above description, it will be apparent that the invention disclosed herein provides a novel and advantageous honeycomb panel that is readily formable by virtue of an easily deformable skin panel. The foregoing discussion discloses and describes merely exemplary methods and embodiments of the present invention. As will be understood by those familiar with the art, the invention may be embodied in other specific forms without departing from the spirit or essential characteristics thereof. For example, the cosmetic panel of the 68 of the structural panel assembly could be composed of stamped metal rather than molded plastic. Accordingly, the disclosure of the present invention is intended to be illustrative, but not limiting, of the scope of the invention, which is set forth in the following claims.

What is claimed is:

1. A formable honeycomb panel comprising:
    a core layer having an open cellular structure with the open cells thereof extending transversely of the core layer, and
    first and second skin panels of sheet material bonded flat to opposite sides of said core layer, wherein said first skin panel is composed of a sheet of material having a plurality of shaped openings extending through the thickness thereof so that said first skin panel has an effective stiffness that is substantially less than the stiffness of a solid sheet of material of the same overall thickness, wherein said skin panels are first bonded to said core layer to produce a flat honeycomb panel that is thereafter formed into a curved structure by bending said honeycomb panel, and wherein the stiffness of said first skin panel is low enough so that a bending load applied to the honeycomb panel sufficient to permanently deform the first skin panel is less than a bending load sufficient to collapse the core layer or to shear the bonds between the core layer and the skin panels.

2. A honeycomb panel as recited in claim 1 wherein said first skin panel is composed of a perforated sheet of metal having perforations extending through said sheet.

3. A honeycomb panel as recited in claim 2 wherein the material remaining between said perforations of said first skin panel forms curved members, and wherein deformation of said first skin panel includes deformation of the shape of said members.

4. A honeycomb panel as recited in claim 3 wherein each of said perforations is shaped as a symmetrical four-sided figure having two opposite concave sides and two opposite convex sides, and wherein adjacent perforations are oriented orthogonally so that each curved member is bounded by a concave side of one perforation and a convex side of an adjacent perforation.

5. A honeycomb panel as recited in claim 1 wherein said first skin panel is composed of a sheet of woven metal fibers, wherein said woven fibers are crimped so that deformation of said first skin panel is accomodated by straightening or further crimping of said fibers.

6. A honeycomb panel as recited in claim 1 wherein said first skin panel is composed of a sheet of expanded metal.

7. A honeycomb panel as recited in claim 1 wherein said second skin panel is composed of a sheet of material having a plurality of openings extending through the thickness thereof so that said second skin panel has an effective stiffness that is substantially less than the stiffness of a solid sheet of material of the same overall thickness, and wherein the stiffness of said second skin panel is low enough so that a bending load applied to the honeycomb panel sufficient to permanently deform the second skin panel is less than a bending load sufficient to collapse the core layer or to shear the bonds between the core layer and the skin panels.

8. A formable honeycomb panel comprising:
a core layer having an open cellular structure with the open cells thereof extending transversely of the core layer, and
first and second skin panels of generally flat sheets of material bonded to opposite sides of said core layer, wherein said first panel is composed of a perforated sheet of metal having a plurality of perforations extending through the thickness thereof and curved members remaining between said perforations, wherein each of said perforations is shaped as a symmetrical four-sided figure having two opposite concave sides and two opposite convex sides and adjacent perforations are oriented orthogonally so that each curved member is bounded by a concave side of one perforation and a convex side of an adjacent perforation, wherein said skin panels are first bonded to said core layer to produce a flat honeycomb panel that is thereafter formed into a curved structure by bending said honeycomb panel, and wherein the stiffness of said first skin panel is low enough so that such bending is accommodated by deformation of said first skin panel including deformation of the shape of said curved members before said core layer collapses or the adhesive bonds between said core layer and said skin panels fail.

9. A formable honeycomb panel comprising:
a core layer having an open cellular structure with the open cells thereof extending transversely of the core layer, and
first and second skin panels of generally flat sheets of material bonded to opposite sides of said core layer, wherein said first and second skin panels are composed of perforated sheets of metal having a plurality of shaped perforations extending through the thickness thereof and curved members remaining between said perforations, wherein said skin panels are first bonded to said core layer to produce a flat honeycomb panel that is thereafter formed into a curved structure by bending said honeycomb panel, and wherein the stiffness of said skin panels is low enough so that such bending is accommodated by deformation of said skin panels including deformation of the shape of said curved members before said core layer collapses or the adhesive bonds between said core layer and said skin panels fail.

10. A formed honeycomb panel comprising:
a core layer, and
first and second skin panels of sheet material bonded to opposite sides of said core layer, wherein said first skin panel is composed of a sheet of material having a plurality of shaped openings extending through the thickness thereof, whereby said first skin panel has an effective stiffness relative to stress in the plane of said first skin panel that is substantially less than the stiffness of an equivalent solid sheet of matrial of the same thickness, and wherein said formed honeycomb panel is fabricated by the process of first bonding said skin panels to said core layer to produce a flat honeycomb panel and thereafter bending said flat honeycomb panel to form said formed honeycomb panel, wherein bending of said flat honeycomb panel is accommodated primarily by deformation of said first skin panel.

11. A structural panel assembly comprising:
a cosmetic panel; and
a reinforcement panel coupled to one side of said cosmetic panel and including a core layer and two skin panels of sheet material bonded to opposite sides of said core layer, wherein at least one of said skin panels is a porous panel having a plurality of shaped openings extending through the thickness thereof so that said porous panel has an effective stiffness that is substantially less than the stiffness of a solid sheet of material of the same overall thickness, wherein said skin panels are first bonded to said core layer to produce a flat panel that is thereafter formed into a curved structure by bending said reinforcement panel, and wherein the stiffness of said porous panel is low enough so that such bending is accommodated by deformation of said porous panel before said core layer collapses or the adhesive bonds between said core layer and said skin panels fail.

12. A structural panel assembly as recited in claim 11 wherein said cosmetic panel is bonded to said reinforcement panel.

13. A structural panel assembly as recited in claim 12 wherein said cosmetic panel is bonded to said porous skin panel of said reinforcement panel.

14. A structural panel assembly as recited in claim 11 wherein said cosmetic panel is composed of sheet molding compound molded to a desired shape and having a substantially uniform thickness.

15. A method for fabricating a curved honeycomb panel comprising the steps of:
fabricating a flat honeycomb panel, said flat honeycomb panel comprising a core layer and two skin panels of sheet material bonded to opposite sides of said core layer, wherein said core layer includes a plurality of cells extending transversely to the core layer, wherein at least one of said skin panels is a porous panel having a plurality of shaped openings extending through the thickness thereof so that said porous skin panel has an effective stiffness that is substantially less than the stiffness of a solid sheet of material of the same overall thickness; and then
bending the flat honeycomb panel into a curved honeycomb panel, wherein the stiffness of said porous panel is low enough so that such bending is accommodated by deformation of said porous panel before said core layer collapses or the adhesive bonds between said core layer and said skin panels fail.

16. A method as recited in claim 15 wherein said step of fabricating a flat honeycomb panel includes the steps of applying an adhesive to said core layer or said skin panels, positioning said two skin panels adjacent both sides of said core layer and placing the assembly in a flat press, and curing the adhesive while the assembly is in said flat press.

17. A method as recited in claim 16 wherein said step of fabricating a flat honeycomb panel includes the steps of placing a plurality of uncured assemblies in said flat press and curing said assemblies simultaneously.

18. A method for fabricating a curved structural panel assembly comprising the steps of:
fabricating a flat honeycomb panel, said flat honeycomb panel comprising a core layer and two skin panels of sheet material bonded to opposite sides of said core layer, wherein said core layer includes a plurality of cells extending transversely to the core layer, wherein at least one of said skin panels is a porous panel having a plurality of shaped openings extending through the thickness thereof so that said porous skin panel has an effective stiffness that is substantially less than the stiffness of a solid sheet of material of the same overall thickness; and then
bending the flat honeycomb panel into a curved honeycomb panel, wherein the stiffness of said porous panel is low enough so that such bending is accommodated by deformation of said porous panel before said core layer collapses or the adhesive bonds between said core layer and said skin panels fail; and then
bonding said curved honeycomb panel to one side of a cosmetic panel.

19. A formable honeycomb panel comprising:
a core layer having an open cellular structure with the open cells thereof extending transversely of the core layer, and
first and second skin panels of sheet material bonded flat to opposite sides of said core layer, wherein said first skin panel is composed of a perforated sheet of metal having a plurality of shaped perforations extending through the thickness thereof and having curved members remaining between said perforations, wherein said first skin panel has an effective stiffness that is substantially less than the stiffness of a solid sheet of material of the same overall thickness such that a bending load applied to the honeycomb panel sufficient to permannently deform the first skin panel is less than a bending load sufficient to collapse the core layer or to shear the bonds between the core layer and the skin panels.

* * * * *